Patented Oct. 28, 1941

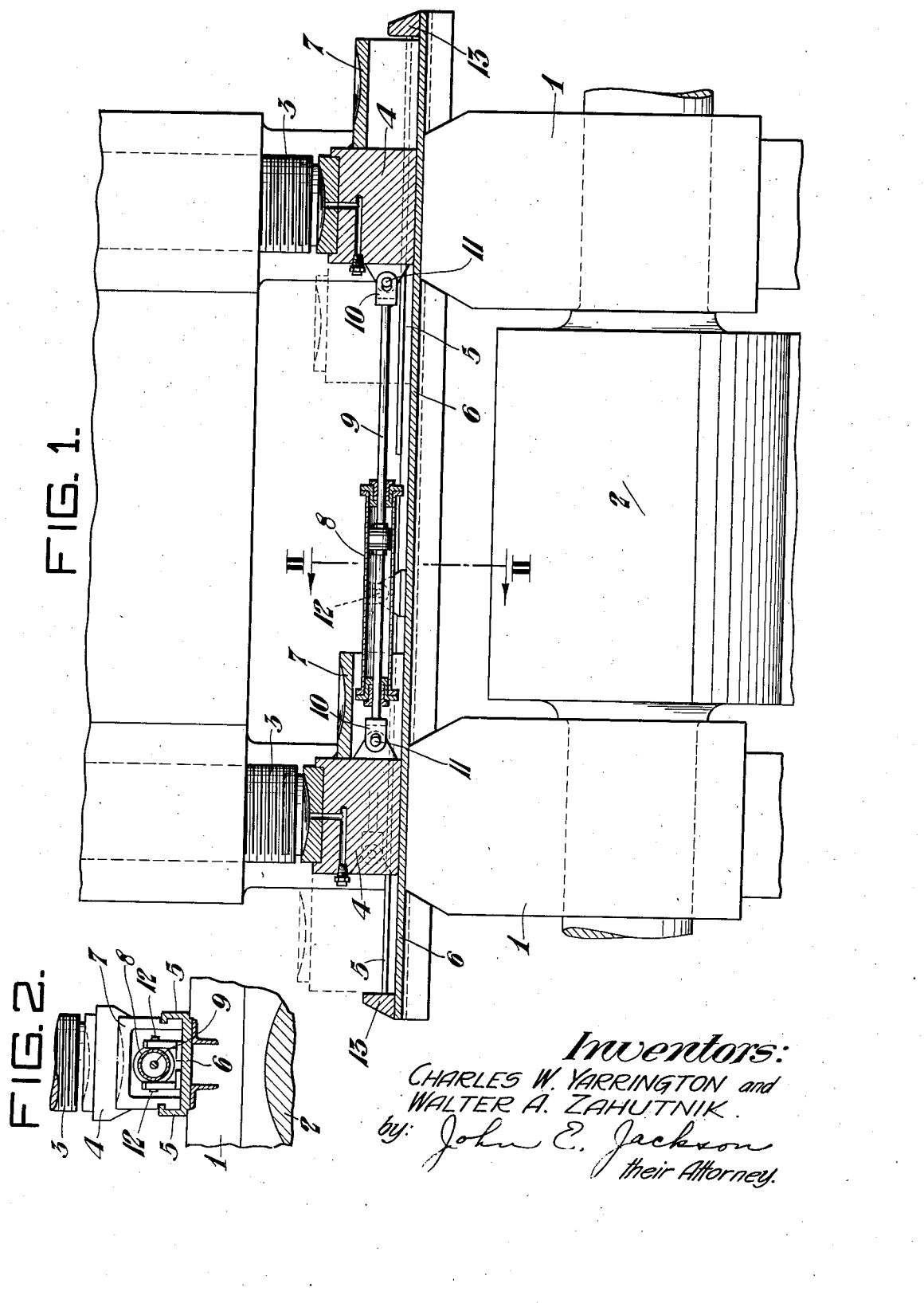

2,260,762

UNITED STATES PATENT OFFICE 2,260,762

ROLLING MILL

Charles W. Yarrington and Walter A. Zahutnik, Gary, Ind.

Application August 31, 1939, Serial No. 292,947

1 Claim. (Cl. 80—57)

This invention relates to rolling mills, one of the objects being to permit the top roll of a mill to be raised more rapidly than can be done when it is necessary to unscrew the pressure screws the complete distance the roll is lifted.

The invention is particularly applicable to a four-high rolling mill, it being necessary in this type of mill to raise the top backing roll to permit changing of the work rolls and the mill screws generally having threads of low pitch which require considerable time to unscrew them the distances the top backing roll must be raised when the working rolls are changed.

A specific example of the invention is illustrated by the accompanying drawing, in which:

Figure 1 is a section of an example of the invention in use;

Figure 2 is a cross section from the line II—II of Figure 1.

More specifically these drawings show bearings 1 journaling the necks of the top backing roll 2 of a four-high mill and the pressure screws 3 which press on these bearings 1 through pressure blocks 4.

According to this invention the pressure blocks 4 ride guideways 5 extending from between the screws 3 and bearings 1 to positions relatively remote therefrom, the pressure blocks 4 horizontally riding these guideways 5 and the latter being positioned on a base plate 6 designed for insertion between the bearings and screws of the conventional mill of this type. The pressure blocks 4 are provided with the usual concave portions fitting the convex portions of the screws 3.

With this arrangement it is only necessary to back up the screws 3 distances permitting the interengaging concave and convex portions to clear, whereupon the pressure blocks 4 may be slid along the guideways 5 from between the screws 3 and bearings 1. When this is done the bearings 1 may be raised by the hydraulic jacks conventionally provided for this purpose.

To control the distances the bearings 1 are raised by the jacks, filler blocks 7 ride the guideways 5 immediately next to and in connection with the pressure blocks 4, these filler blocks 7 being shown on the right sides of the pressure blocks in the drawings. When the pressure blocks 4 are slid from between screws 3 and bearings 1, the filler blocks 7 simultaneously move to positions between the screws and bearings. The heights of these filler blocks are less than the heights of the pressure blocks, the heights of the filler blocks being proportioned according to the distances the bearings 1 must be raised to permit work roll changes. The function of these filler blocks 7 is to prevent the jacks raising the bearings 1 so far as to jam the base plate 6 and the parts it carries against the mill screws 3.

Reciprocation of the pressure blocks 4 and filler blocks 7 is effected by a double-acting hydraulic motor 8 having its piston connected with the parts to be moved by way of a connecting rod 9 fixed to these parts by clevises 10 having slots in which the clevis pins 11 work, this permitting slight movements of both the pressure blocks 4 and filler blocks 7 as their concave surfaces are engaged by the convex surfaces of the mill screws 3. It is to be understood that the filler blocks 7 have concavities for fitting the convexities of the mill screws. The hydraulic motor 8 is centrally trunnioned as at 12 in a relatively loose manner to accommodate horizontal misalignment of the bearings 1. The ends of the base plates 6 are provided with abutments 13 for positively limiting the reciprocation of the various parts that move in the operation of the device.

The base plate 6 and all of the parts it carries constitutes a unitary assembly that may be passed through the frame windows of almost any conventional four-high mill. This assembly must be removed at the time it is necessary to change a backing roll and it is for this reason that a hydraulic motor is used to reciprocate the various blocks. This follows because the jacks of four-high mills which lift their top backing roll bearings are hydraulically powered and the usual source of power of these jacks, therefore, may be coupled by a flexible conduit to the motor 8 through suitable valves for controlling its double action. When it is required to remove the assembly, it is only necessary to uncouple the flexible conduits from the motor 8, raise the mill screws 3 sufficiently to clear the interengaging convex and concave parts, and slide the assembly from the mill.

We claim:

Rolling mill equipment comprising a base plate adapted to be positioned on top of the top roll neck bearings of a mill beneath the mill screws for applying pressure to said bearings, guideways positioned on top of said plate to extend from positions beneath said screws to relatively remote positions, pressure blocks riding said guideways, and a motor on said plate for reciprocating said blocks along said guideways, the latter also carrying filler blocks for movement to positions where they may control lifting of said bearings when said pressure blocks are moved from between said bearings and said screws, said pressure blocks and said filler blocks being interconnected for simultaneous movement along said guideways and said base plate carrying all said elements as a unitary assembly that can be passed through the frame windows of a conventional mill.

CHARLES W. YARRINGTON.
WALTER A. ZAHUTNIK.